(12) United States Patent
Smith (10) Patent No.: US 7,006,038 B2
(45) Date of Patent: Feb. 28, 2006

(54) SYSTEM AND METHOD FOR DETERMINING OPTIMAL BROADCAST AREA OF AN ANTENNA

(75) Inventor: Steve Smith, Cleveland, SC (US)

(73) Assignee: The Liberty Corporation, Greenville, SC (US)

( * ) Notice: Subject to any disclaimer, the term of this patent is extended or adjusted under 35 U.S.C. 154(b) by 479 days.

(21) Appl. No.: 10/408,478

(22) Filed: Apr. 7, 2003

(65) Prior Publication Data

US 2003/0197642 A1  Oct. 23, 2003

Related U.S. Application Data

(60) Provisional application No. 60/370,461, filed on Apr. 5, 2002.

(51) Int. Cl.
*H01Q 3/00* (2006.01)
*H04Q 7/20* (2006.01)
*G01R 1/00* (2006.01)

(52) U.S. Cl. .................. 342/360; 343/703; 455/446
(58) Field of Classification Search ............... 342/360, 342/374; 343/703; 455/446
See application file for complete search history.

(56) References Cited

U.S. PATENT DOCUMENTS

| | | | | |
|---|---|---|---|---|
| 5,903,826 A | * | 5/1999 | Nowak | 342/374 |
| 6,104,936 A | * | 8/2000 | Kronestedt | 343/757 |
| 2004/0252055 A1 | * | 12/2004 | Thomas et al. | 342/372 |
| 2005/0046514 A1 | * | 3/2005 | Janoschka | 343/853 |

FOREIGN PATENT DOCUMENTS

JP  2001308782 A  * 11/2001

OTHER PUBLICATIONS

K. Praba, Factors involved in gain determination of a TV antenna, IEEE-Transactions-on-Broadcasting (USA), vol. BC-25, No. 1, p. 14-18, Mar. 1979.*
B.J. Skene, The calculation of radiation patterns for transmitting aerial arrays using dipole reflector panels and operating in the broadcast bands, Radio-and-Electronic-Engineer (UK), vol. 48, No. 5, p. 235-245, May 1978.*

* cited by examiner

*Primary Examiner*—Thomas H. Tarcza
*Assistant Examiner*—Fred H. Mull
(74) *Attorney, Agent, or Firm*—Douglas W. Kim; McNair Law Firm, P.A.

(57) ABSTRACT

This invention is directed to a system and method for determining the broadcast coverage of an antenna without having to go through the steps of actually building the antenna. The antenna characteristics, including mechanical and electrical beam tilt, are received and intercept points representing a predetermined decreasing signal strength are calculated to define a broadcast area representing predetermined decrease in signal strength. Once this area is determined, it can be overlayed on the geographical information associated with the antenna so that the broadcast area of the decreased signal strength can be shown graphically. This information can then be altered to anticipate the broadcast coverage of an antenna without having to physically construct or manipulate the antenna itself. This invention is a considerable improvement over the current state of technology so as to allow the optimal determination of broadcast areas for an antenna without having to physically construct the antenna themselves.

16 Claims, 9 Drawing Sheets

SYSTEM AND METHOD FOR DETERMINING OPTIMAL BROADCAST AREA OF AN ANTENNA

FIELD OF THE INVENTION

This invention is directed to a system and method of determining the broadcast coverage of an antenna or broadcast array, namely, a system and method for analyzing the coverage of energy radiating out of a broadcast array based upon the beam tilt or declination of the array. This application claims priority from provisional patent application Ser. No. 60/370,461 entitled System And Method For Determining Broadcast Area Of An Antenna, filed Apr. 5, 2002.

BACKGROUND OF THE INVENTION

When broadcasting energy such as with television broadcast, radio broadcast, radar or other emissions, energy is radiated from a broadcast point to provide electronic transmissions to consumers or other receivers. For example, in the television broadcast industry, the television signal is beamed from towers having antennae or broadcast arrays designed to reach a specific coverage area. In constructing a broadcast tower with an antenna array affixed to the top, there is a relationship between the height of the tower, the shape of the beam, the gain of the antenna, the specific array elements, the mechanical or electrical tilt, the cost of the tower, and the broadcast area reached. Generally, the higher the tower, the larger the broadcast area. However, the higher the tower, the higher the cost. Therefore, it is desirable to have a tower height that sufficiently reaches the desired broadcast area while keeping the height to a necessary minimum for such broadcast.

Additionally, the broadcast area can be increased by increasing the strength of the signal emitted and, therefore, the strength of the transmitter. Again, however, the greater the strength, the higher the cost. One specific factor affecting the performance of the broadcast array is the tilt of the broadcast array or beam tilt. This factor plays a significant role in the coverage area of the antenna. By optimizing the beam tilt, an optimal coverage area can be achieved without solely relying upon tower height or transmission strength. Accordingly, there is a need to be a reliable and informative way of analyzing broadcast areas so as to maximize the broadcast area while minimizing the cost.

Traditionally, it is known to analyze the broadcast area, or coverage, by using a Longley-Rice analysis model. The Longley-Rice model was developed in 1978 and is applied to point-to-point communications over varying terrain. The Longley-Rice model predicts long-term median transmission loss over an irregular terrain pattern relative to the free-space transmission loss. This means that the Longley-Rice model allows the calculation of broadcast area according to the specific terrain or geographical and physical features of the target area and the characteristics of the antenna itself. For example, buildings, hills, and other solid structures will affect the broadcast area coverage while having flat open plains renders a different result. Field strength is predicted using the path of the terrain and the relativity of the troposphere. The signal strength within the radio horizon is calculated according to the prediction of interference from obstacles based on a fresnel-kirchof's knife-edge. Unfortunately, the Longley-Rice method performs its calculations based upon the center point of the transmission beam and assumes that transmissions are one-dimensional. Clearly, the physical realities of a transmission beam are that it radiates from the source of origin as a true propagating wave and is certainly not one-dimensional. Therefore, an analysis model is needed to consider the fact that a transmission is three-dimensional, at least, rather than the traditional and theoretical one-dimensional model.

Accordingly, it is an object of this invention to provide for an analysis method for calculating broadcast areas based on beam tilt of a particular tower height and transmission strength so that the most advantageous beam tilt for the broadcast area can be determined.

It is yet another object of this invention to provide an analysis method that takes into account the physical realities of energy transmissions operating on three dimensions.

It is yet another object of this invention to provide for an easy-to-use analysis method with easily viewable results so as to assist in the determination of the broadcast area based upon an antenna's characteristics.

SUMMARY OF THE INVENTION

The above objectives are accomplished according to the present invention by providing a system and method for receiving antenna information having detailed information representing the broadcast characteristics for a given geography of the antenna, determining a first and second intercept point for predetermined decrease in field strength according to the antenna information, defining a broadcast area defined by the first and second intercept point, and outputting the broadcast area so that the broadcast area can be provided by representing the broadcast coverage of the antenna for the predetermined decreasing field strength. The output of the broadcast area can be done graphically so as to be displayed and can be overlayed with the geography associated with the antenna so that the broadcast area can be shown in maplike format. A third and fourth intercept point can be calculated for a second predetermined decrease in field strength so that the broadcast areas associated with the second predetermined decrease in field strength can be shown. The method and system can perform these steps for a plurality of antennae to determine the collective broadcast coverage for a series of antennae. Additionally, this method and system can perform comparisons of several antennae settings so that alterations to the characteristics of the antenna, such as the beam tilt, can be analyzed to show the associated broadcast area for comparison between the beam tilt and a comparison beam tilt.

DESCRIPTION OF THE DRAWINGS

The invention will be more readily understood from a reading of the following specification and by reference to the accompanying drawings, wherein an example of the invention is shown, and wherein.

DESCRIPTION OF A PREFERRED EMBODIMENT

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result. These steps require physical manipulations of physical quantities such as electrical or magnetic signals capable of being stored, transferred, combined, compared, or otherwise manipulated. An object or module is a section of computer readable code embodied in a computer readable medium that is designed to perform a specific task or tasks. Actual computer or executable code or computer readable code may not be contained within one file or one storage medium but may span several computers or storage mediums. The term "host" and "server" may be hardware, software, or combination of hardware and software that provides the functionality described herein.

The present invention is described below with reference to flowchart illustrations of methods, apparatus ("systems") and computer program products according to the invention. It will be understood that each block of a flowchart illustration can be implemented by a set of computer readable instructions or code. These computer readable instructions may be loaded onto a general purpose computer, special purpose computer, or other programmable data processing apparatus to produce a machine such that the instructions will execute on a computer or other data processing apparatus to create a means for implementing the functions specified in the flowchart block or blocks.

These computer readable instructions may also be stored in a computer readable medium that can direct a computer or other programmable data processing apparatus to function in a particular manner, such that the instructions stored in a computer readable medium produce an article of manufacture including instruction means that implement the functions specified in the flowchart block or blocks. Computer program instructions may also be loaded onto a computer or other programmable apparatus to produce a computer executed process such that the instructions are executed on the computer or other programmable apparatus provide steps for implementing the functions specified in the flowchart block or blocks. Accordingly, elements of the flowchart support combinations of means for performing the special functions, combination of steps for performing the specified functions and program instruction means for performing the specified functions. It will be understood that each block of the flowchart illustrations can be implemented by special purpose hardware based computer systems that perform the specified functions, or steps, or combinations of special purpose hardware or computer instructions. The present invention is now described more fully herein with reference to the drawings in which the preferred embodiment of the invention is shown. This invention may, however, be embodied any many different forms and should not be construed as limited to the embodiment set forth herein. Rather, these embodiments are provided so that this disclosure will be thorough and complete and will fully convey the scope of the invention to those skilled in the art.

Referring now to the drawings, the invention will now be described in more detail. As can best be seen in FIG. 1, broadcast tower 10 is shown with transmissions emitting radiation energy generally designated as A. The peak output designation, or centerline 14, is shown representing the peak strength, or centerline, of a transmission beam. Unfortunately, this line represents the center of the beam transmission which artificially represents the transmission energy as one-dimensional. Accordingly, calculations that are based upon centerline 14 alone have inherent inaccuracies as they assume a one-dimensional energy transmission. Geographic surface 16 is shown having a curvature with horizon 18 shown exaggerated. Centerline 14 is shown intercepting geographic surface 16 at horizon 18. Therefore, centerline 14 does not continue past horizon 18 since it is physically obstructed when intercepting the horizon. As such, the signal is shown unable to travel along line 20. Further, transmissions generally do not propagate directly downward and, therefore, there is an area underneath the broadcast tower where a signal is not sent and, therefore, reception cannot be received. Calculations based upon the use of the centerline, particularly that of the Longley-Rice analysis, do not accurately portray the actual broadcast energy being transmitted outside the centerline which leads to inaccurate results, unnecessarily tall towers or unnecessarily powerful transmitters.

Figure 1:
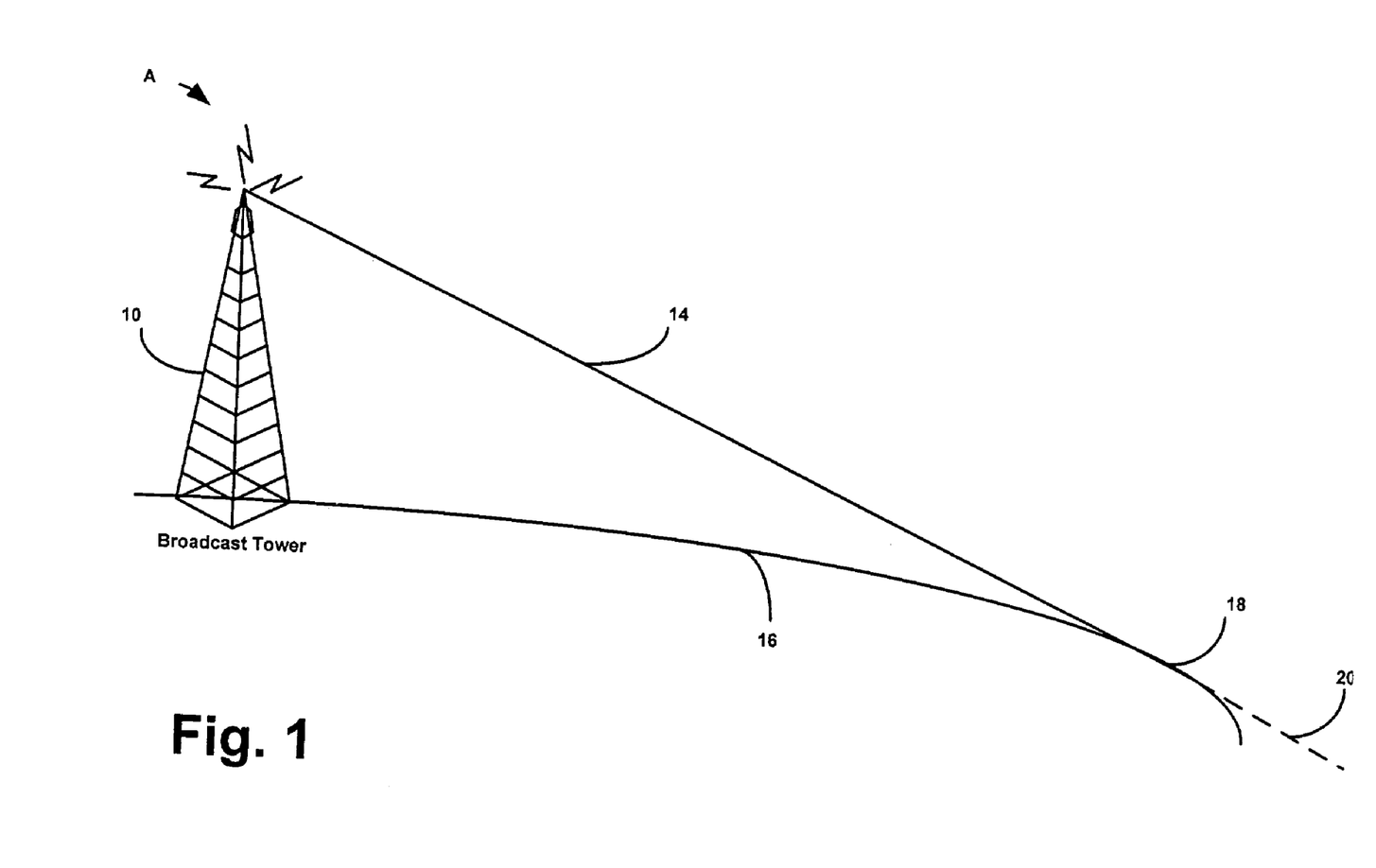
FIG. 1 is a schematic of a broadcast tower and transmission signal.
Figure 2:
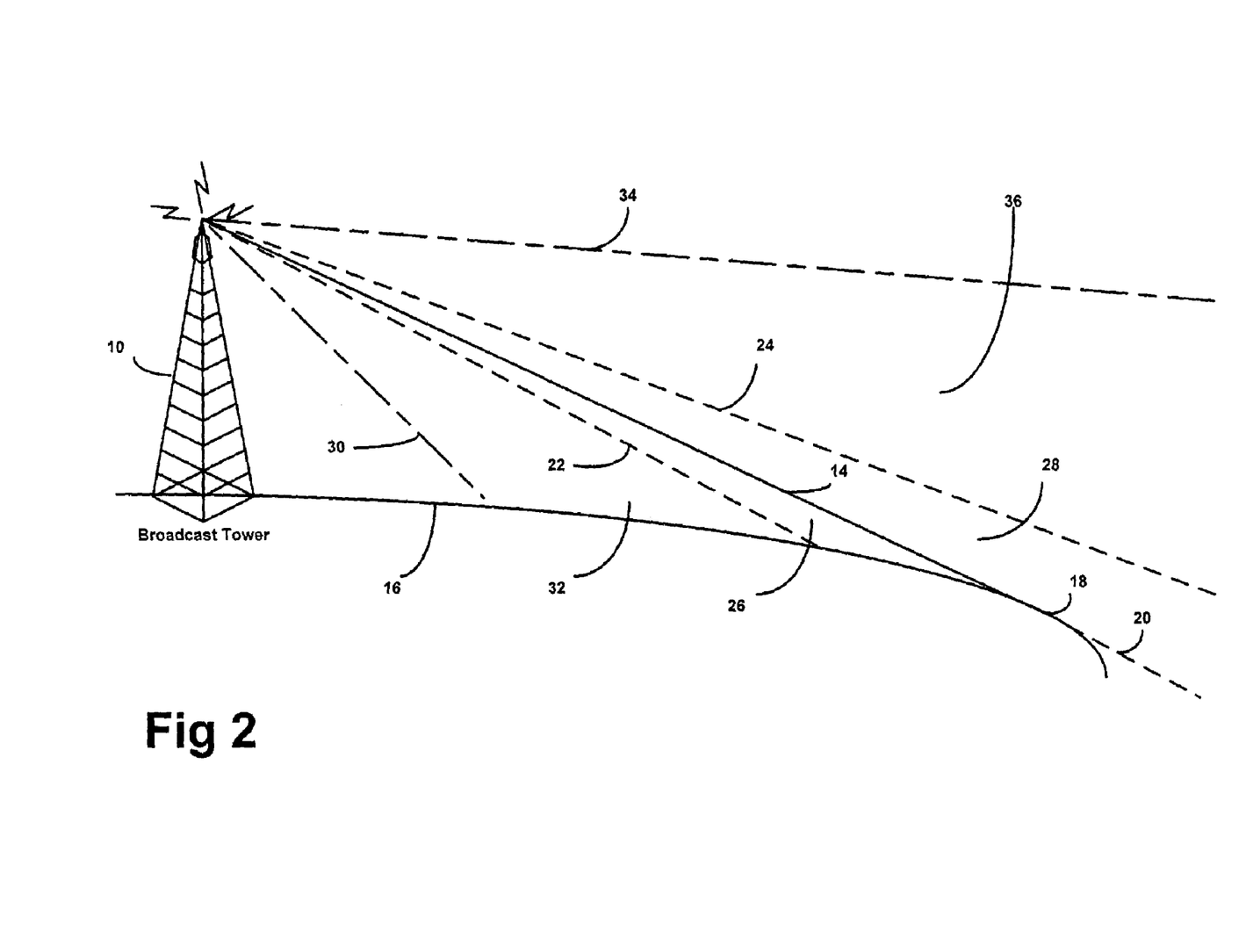
FIG. 2 is a schematic of a broadcast tower and transmission signal.

Referring now to FIG. 2, a more accurate representation of broadcast energy is shown as well as in centerline 14. Broadcast energy transmitted into an area has a signal strength related to the distance, or angle away from, centerline 14. It is known in the art that broadcast energy of one decibel (1 dB) off the centerline is more than acceptable so as to provide for sufficient reception of the signal to the consumer. In FIG. 1B, a 1 (dB) lower intercept point 22 is shown below centerline 14, while a 1 (dB) upper intercept point 24 is shown above centerline 14. An area defined by centerline 14 and lower 1 (dB) intercept point 22 is a lower 1 (dB) area 26 where broadcast transmissions are within 1 (dB) of the centerline and sufficient for reception. Therefore, a consumer within lower 1 (dB) area 26 is provided with a sufficient signal so as to receive a broadcast such as television. An upper 1 (dB) area 28 is defined between centerline 14 and upper 1 (dB) intercept point 24 and also contains a sufficient signal for the consumer. It is within the lower and upper 1 (dB) areas illustrated that the disadvantages of previous broadcast analysis tools is shown. Using the traditional one-dimensional analysis, centerline 14 would point to the horizon in an attempt to maximize the broadcast area. However, it is shown that these inferior models result in a significant waste of energy as upper 1 (dB) area 28 is being broadcast above the horizon and, therefore, due to the curvature of the earth and other geographic constraints, is simply not able to be reached by potential consumers. Relying upon these previous inferior analysis models leads to wasteful and unoptimized configurations and operations of broadcast towers. Since the upper 1 (dB) area contains a broadcast signal well within the acceptable energy strength to provide service to potential consumers, this invention allows for the determination of what configuration of broadcast array 12 may result in more advantageously utilizing the upper 1 (dB) area rather than merely transmitting the energy over the horizon.

Figure 3:
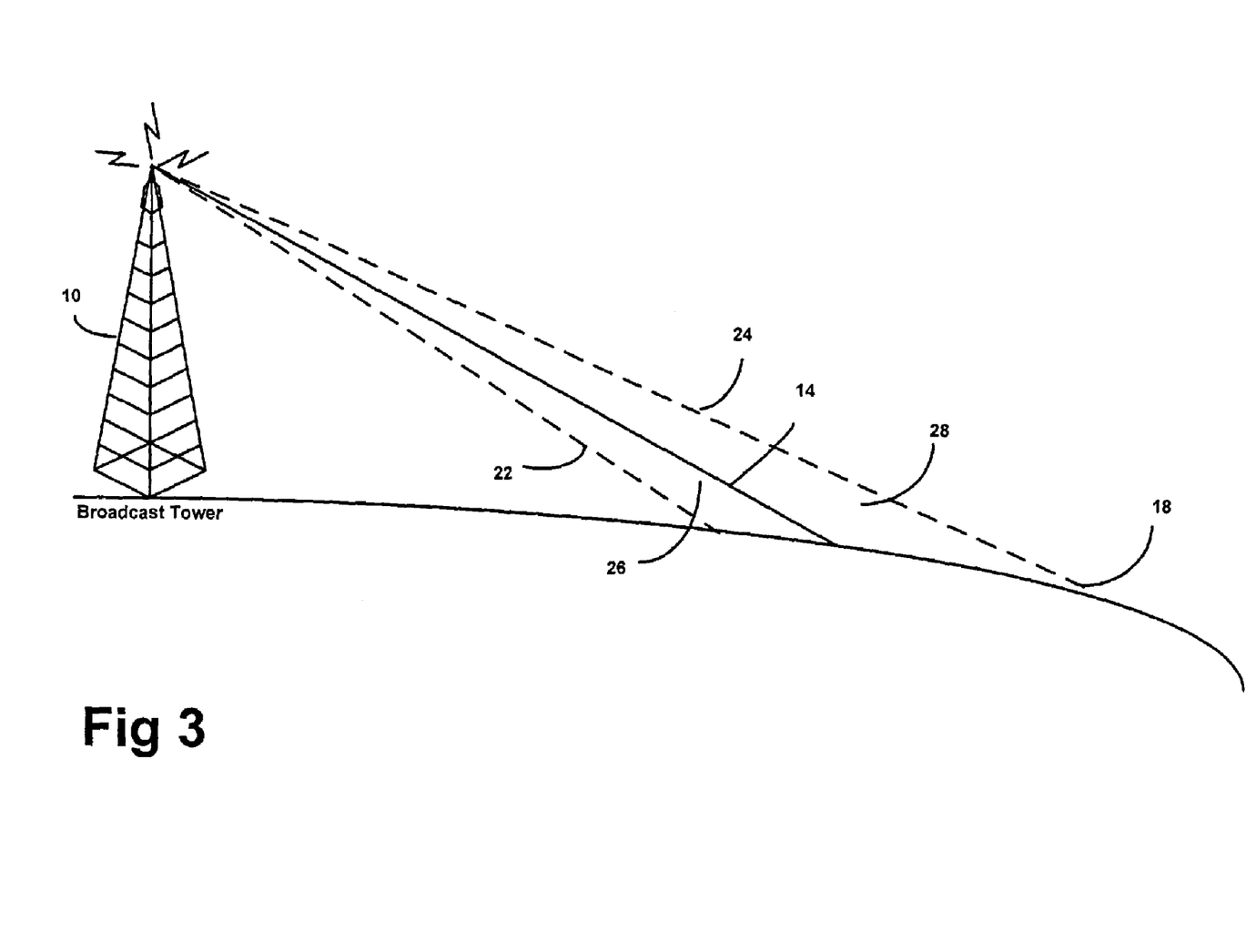
FIG. 3 is a schematic of a broadcast tower and transmission signal.

Referring now to FIG. 3, the upper intercept point 24 is shown intercepting with horizon 18. Therefore, both upper 1 (dB) area 28 and lower 1 (dB) area 26 are able to reach potential consumers. By utilizing this invention, it is possible to determine a significantly more optimal beam tilt or other characteristic of broadcast array 12 so as to maximize the amount of energy radiated to reach the maximum number of potential consumers. Simply, upper 1 (dB) area 28 is not being broadcast past the horizon so as to be unreachable by potential recipients. Additionally, when an antenna is configured so that energy is transmitted beyond the horizon, it can create interference for other transmissions and may create regulatory issues for the operator or owner of the antenna.

Using the specific example of television broadcast signals, it is also known that transmitting a 3 (dB) decrease in signal strength of centerline 14 is well within acceptable limits for analog signals so that a potential consumer can receive sufficient broadcast for television. The disruption to the broadcast energy at 3 (dB) is well within acceptable levels and does not result in substantial loss for television broadcast recipients. Therefore, this invention can be used to determine a lower 3 (dB) intercept point 30 (FIG. 2) to define a lower 3 (dB) area 32 between lower 1 (dB) intercept 22 and lower 3 (dB) intercept point 30. Accordingly, an upper 3 (dB) intercept point 34 (FIG. 2) can define an upper 3 (dB) area 36 between upper 1 (dB) intercept point 24 and upper 3 (dB) intercept point 34.

Figure 4:
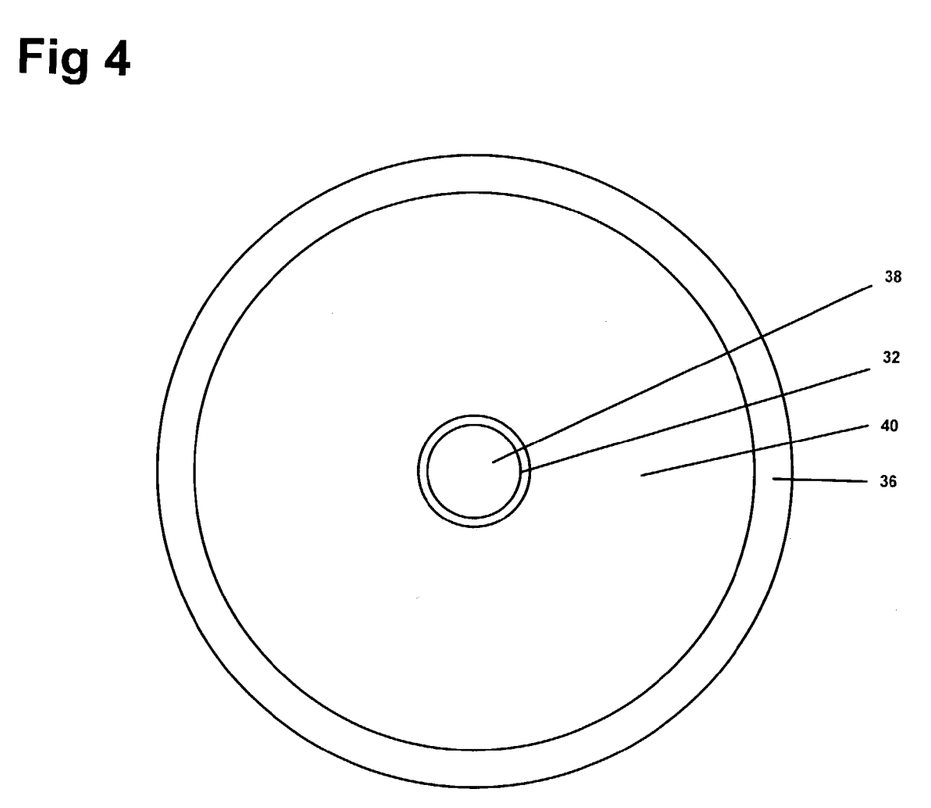
FIG. 4 is a top-down schematic showing various broadcast strengths relative to a transmission point.

Referring now to FIG. 4, the broadcast energy as it radiates from broadcast tower 10 is explained in more detail. As previously explained, there may exist an area directly underneath the broadcast tower for which no signal can be received shown as 38. Area 38 primarily exists due to the fact that broadcast energy does not broadcast in 360 degrees and all directions from the array, but rather broadcasts out from the array. Lower 3 (dB) broadcast area 32 as defined immediately outside area 38. An area of both lower 1 (dB) area 26 and upper 1 (dB) area 28 is shown as 40 and adjacent to lower 3 (dB) area 32. Upper 3 (dB) area 36 is shown adjacent to area 40 and is along the perimeter of the broadcast area. Broadcast energy is also transmitted past the 3 (dB) intercept point 36, but may not be deemed of sufficient strength to provide for acceptable reception to potential customers. Particular to television broadcasts, it is advantageous to have the maximum area of the broadcast area correspond to the outer edge of the 1 (dB) broadcast area, but since the 3 (dB) area can be acceptable, it too can provide for sufficient broadcast strength so as to reach recipients within the fringes of the broadcast area.

As a practical matter, the greater the distance from the broadcast tower, the more powerful the receiving equipment may have to be for recipients. For potential customers who live far from the broadcast point, they normally must have substantially improved reception equipment in order to improve the picture display on their televisions. As such, individuals living a specific distance from the broadcast tower are more inclined to be able to have adequate reception of a 3 (dB) signal than those living closer to the tower.

By using this invention, the declination or tilt of a broadcast array can be much better determined so as to maximize the broadcast area while minimizing the tower height and transmission strength. Significant cost can be achieved by being able to keep the transmitter power as low as possible as well as keeping the tower height as low as possible.

Figure 5:
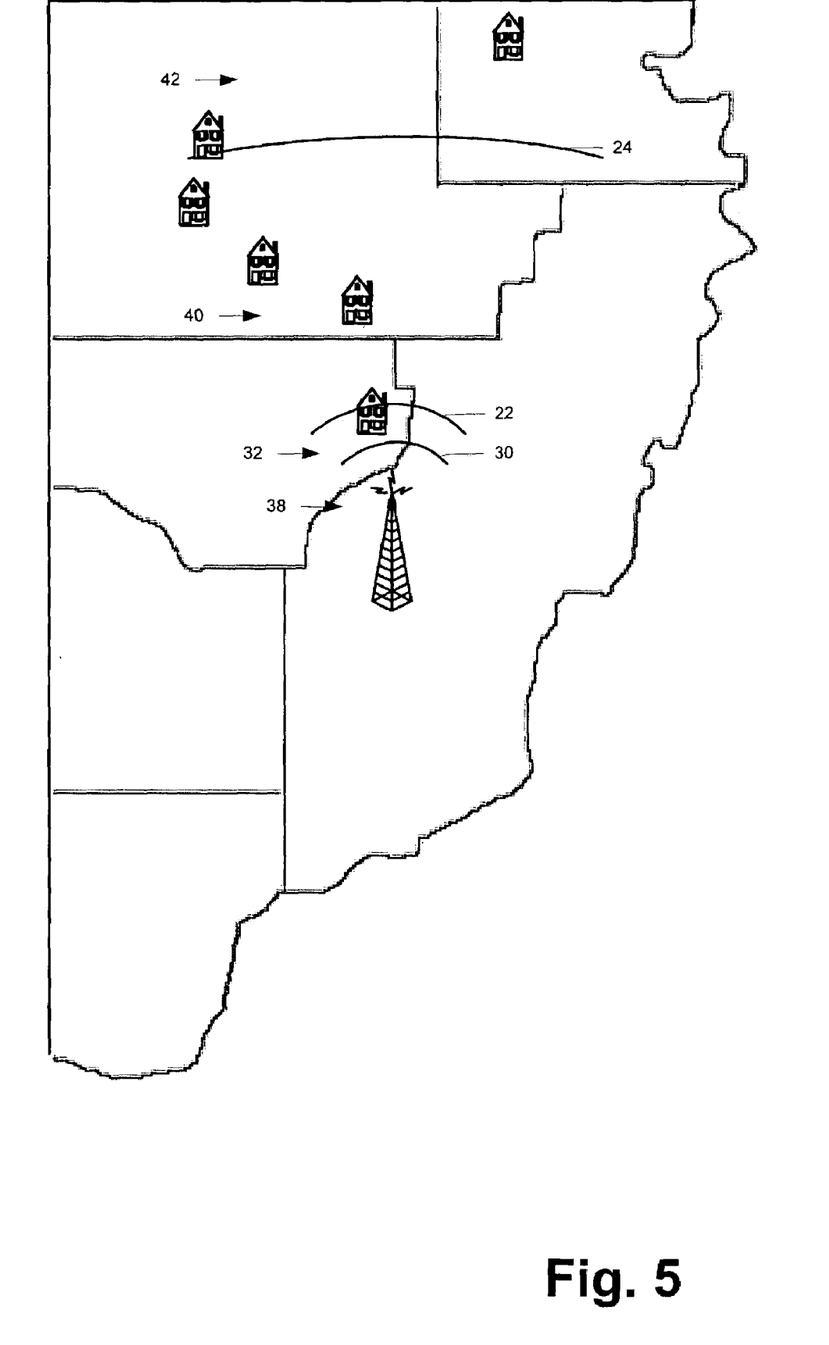
FIG. 5 is an example of analysis using this invention.

Referring now to FIG. 5, examples of the analytical results of this invention are further illustrated. The results achieved by a beam tilt angle of 0.75° is shown. Intercept point 30 represents the boundary of minimum tower area 38 and is generally a greater than 3 (dB) decrease in signal strength. Area 32 represents lower 3 (dB) area bounded by intercept point 30 and intercept point 22 so as to represent signal strength between 1 (dB) and 3 (dB). Area 40 is bounded by intercept points 22 and 24. Area 42 represents a geographical location for which no signal is able to reach and defines the outer perimeter of the broadcast area, based upon factors such as geography, and represents a practical limit for transmissions. This angle of the declination beam tilt can be charted and it can be seen that in any 0.075° declination in this particular geographic region where a particular tower and broadcast ray shows that 1 (dB) signal strength is more than likely being transmitted outside the broadcast limits and is resulting in a loss of energy.

Figure 6:
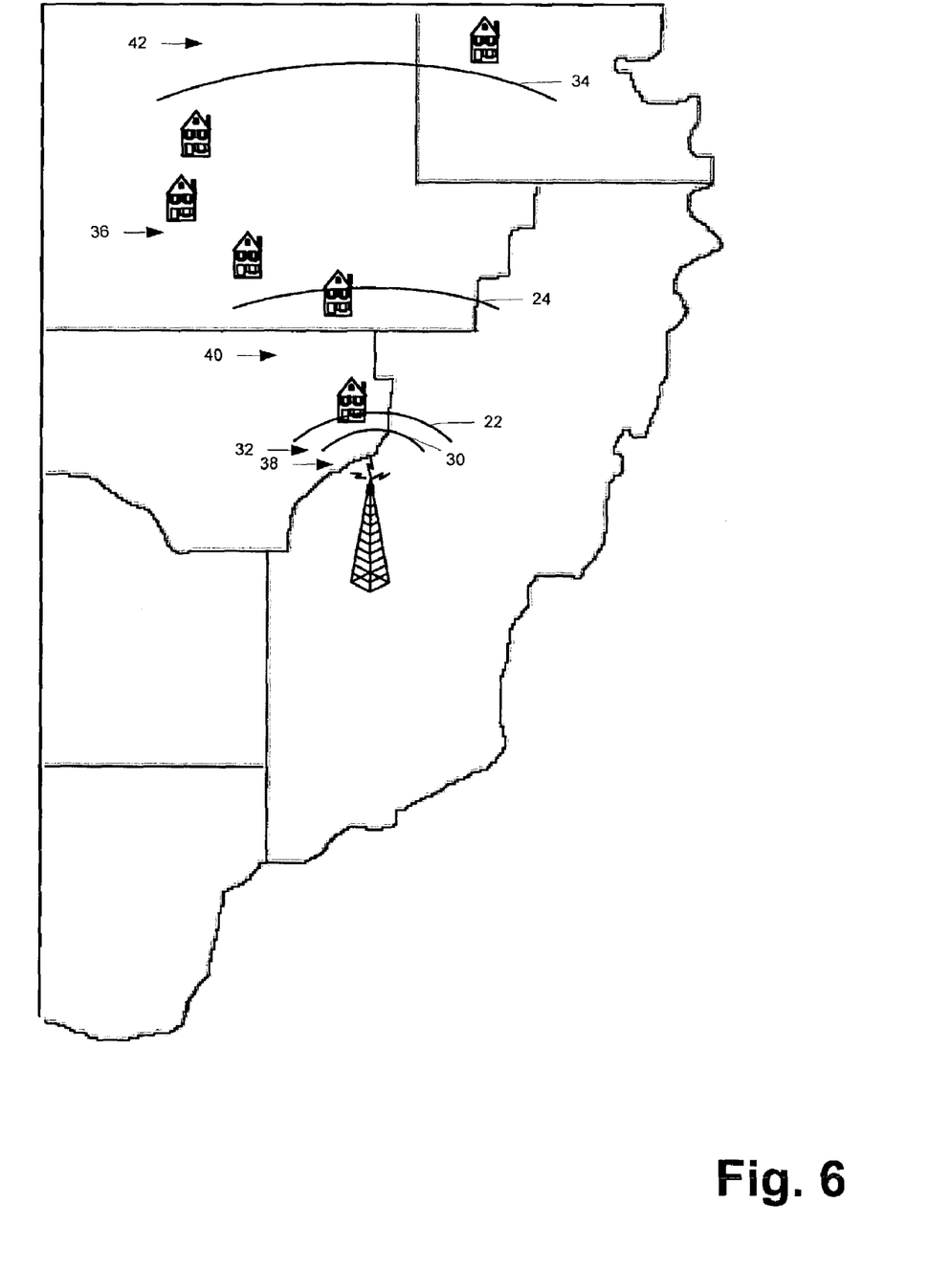
FIG. 6 is an example of analysis using this invention.

Referring now to FIG. 6, beam tilt of 1.25° is shown analyzed. Here the same area is represented as in FIG. 3 with the addition of the upper 3 (dB) area 36 being shown. Again, the signal strength hits the outer perimeter of the broadcast area but most notably is the large portion of upper 3 (dB) area 36 compared to a much smaller portion of 1 (dB) area 40. This result shows that the beam tilt is far too great since this results in a minimization of the 1 (dB) area 40.

Figure 7:
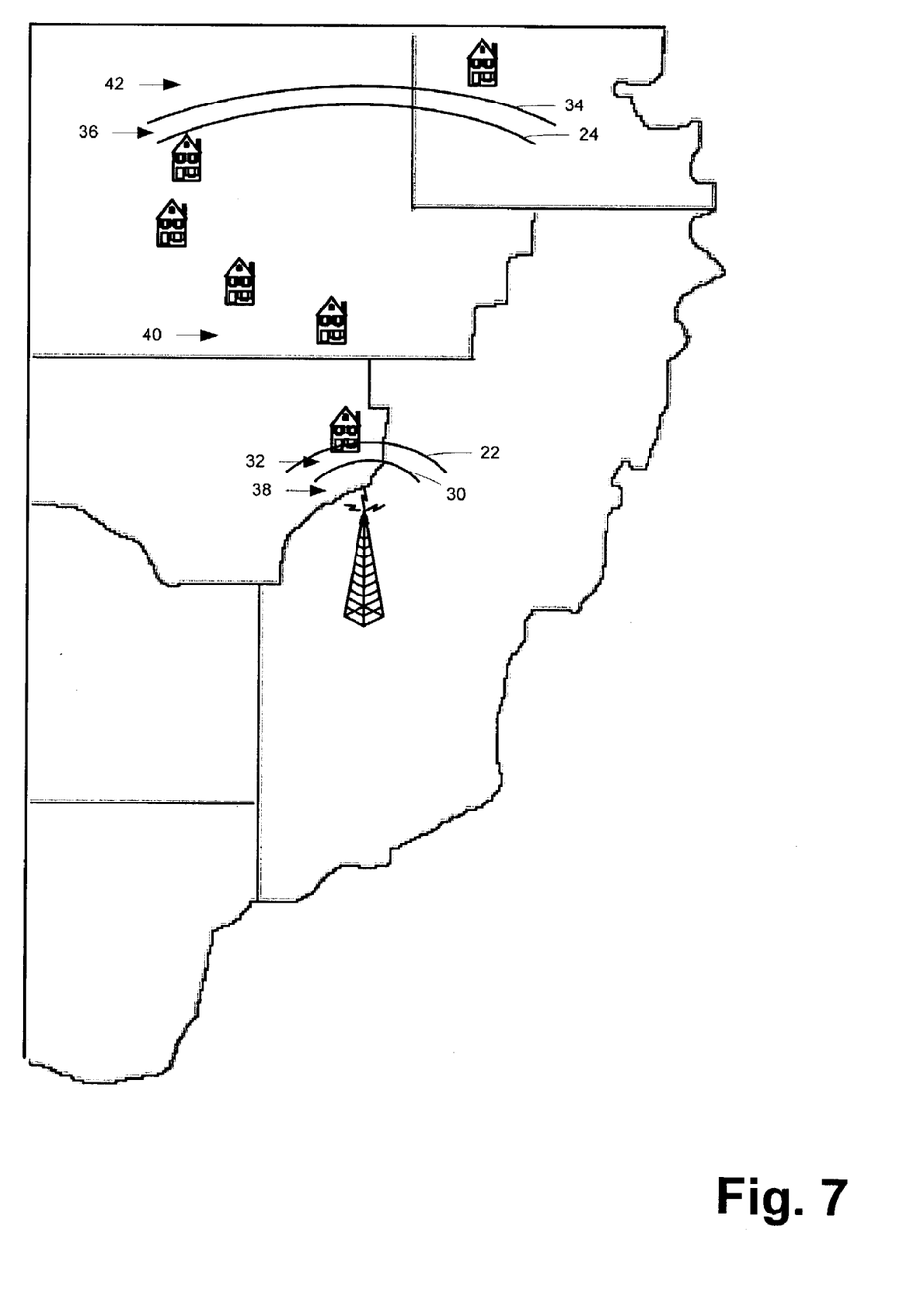
FIG. 7 is an example of analysis using this invention.

Referring to FIG. 7, a beam tilt of 1.0° is shown to produce the results according to this invention. It is easily shown the upper 3 (dB) area 36 is at the edge of the broadcast area where, as discussed above, is within acceptable tolerances. Secondly, the 1 (dB) area 40 is optimized since it is shown that the edge of the broadcast area corresponds with the boundary between the 1 and 3 (dB) area. As such, the declination of 1.0° clearly shows as optimal declination over beam tilts of 0.75° and 1.25°, respectively. Therefore, the broadcast area has been increased due to this invention's ability to assist in determining the optimal declination of broadcast array. Further, the lower area of the 0.75° tilt is a larger area than that of a 1.0° beam tilt allowing for the increase of the potential consumer base.

Figure 8:
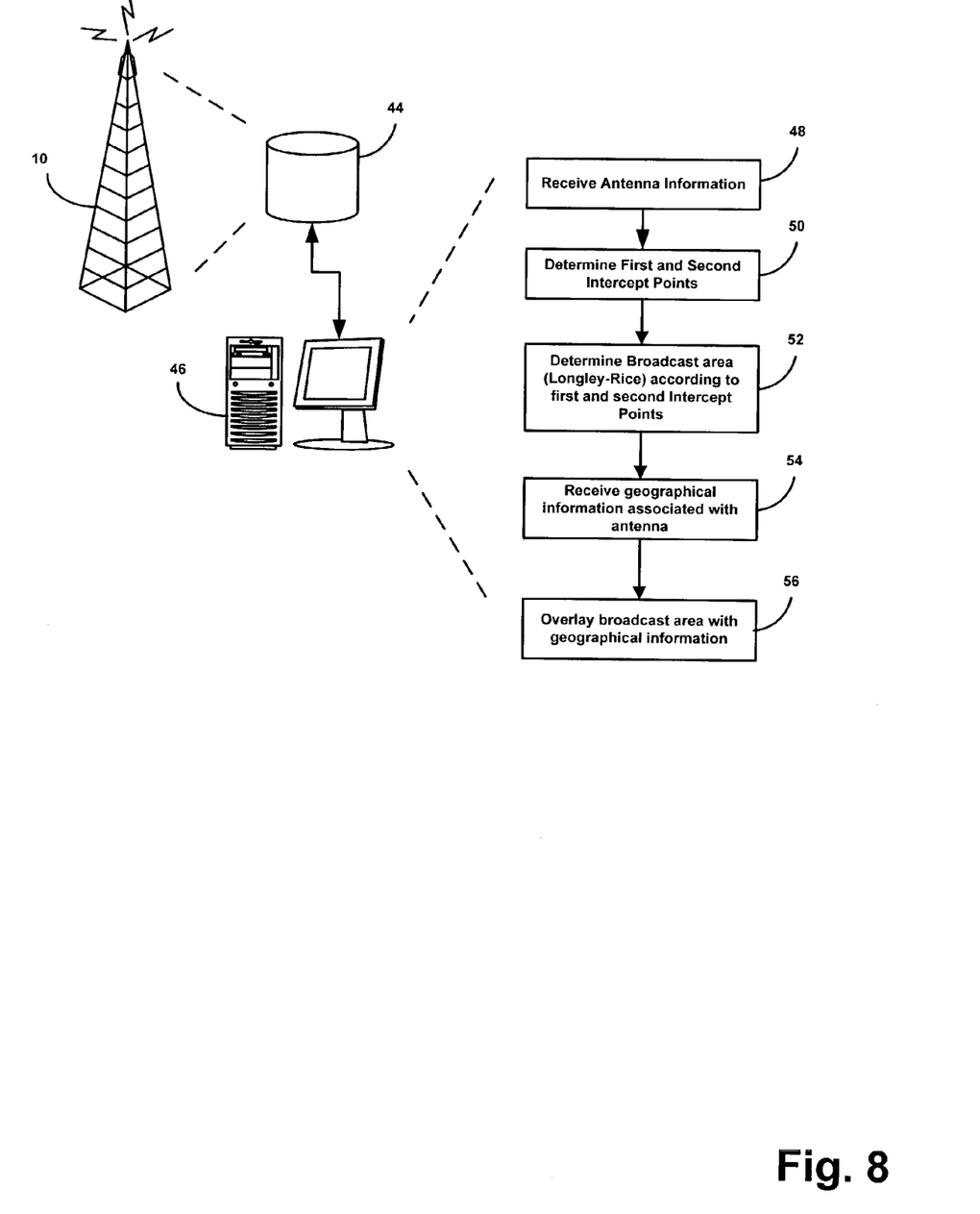
FIG. 8 is a flowchart illustrating this invention.

Referring now to FIG. 8, the functionality of this particular invention is explained in more detail. Antenna information is gathered from antenna 10 representing the antenna characteristics of the antenna and received at server 46. The server, having a computer readable medium and computer readable instructions, can store this information in database 44. After receiving the antenna information at step 48, the upper and lower, or first and second, intercept points are determined in step 50. In using a television broadcasting example, the first and second intercept points can be calculated for a predetermined decrease in signal strength such as the 1 (dB) intercept points, or where signal strength decreases 1 (dB). One method of determining the intercept point and ultimately the 1 (dB) broadcast area is to perform a Longley-Rice calculation, known in the art, for the particular decrease in signal strength. Other intercept points, additional or otherwise, can be used such as third and fourth intercept points for a 3 (dB) decrease in signal strength and even further intercept points such as 6 (dB) decrease in signal strength or lower. Once at least two intercept points are determined, traditional calculations are performed according to these lower and upper intercept points at step 52 to determine where the boundary of the lower signal strength intersects the ground. The area of the lower signal strength can then be calculated. In order to provide the area of lower signal strength in context, geographical information associated with the antenna is received in step 54. The area of lower signal strength can then be overlayed with the geographic information to show, geographically, the area of lower strength in step 56.

Figure 9:
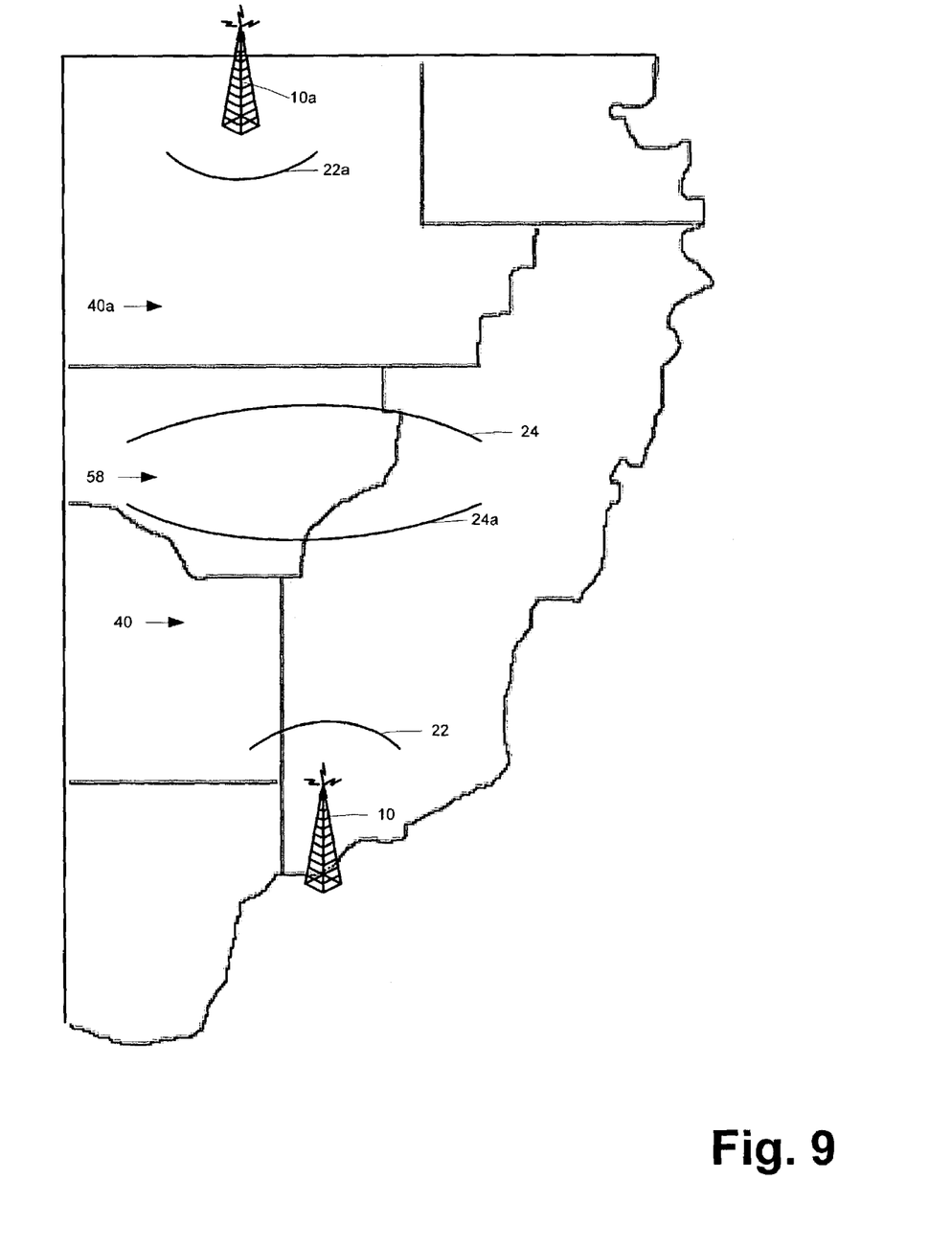
FIG. 9 is an example of analysis using this invention.

Further, this invention can operate on multiple antennas to show, and predict, broadcast area overlap both when desirable and when not. Referring to FIG. 9, antenna 10 is shown with a 1 (dB) area 40 having an outer boundary, or intercept point 24. An antenna 10a is also shown with a 1 (dB) area overlap forming overlap area 58. If it is not desirable to have overlap area 58, the beam tilt of antenna can be reduced so that overlap area 58 is reduced to maximize broadcast area 40a while minimizing overlap area 58.

While particular energy levels of 1 (dB) are used for an example, it should not limit the scope of this invention. In the event that it is desirable to know the coverage of both the 1 (dB) area as well as the lower 3 (dB) area, the intercept points can again be selected for third and fourth intercept points. The upper and lower 1 (dB) intercept points and additional intercept points are calculated to produce results for multiple predetermined levels of signal decrease. Additionally, a broadcast area can be determined for a specific beam tilt than compared to a comparison broadcast area defined by a comparison first and second intercept point for a comparison beam tilt. While a preferred embodiment of the invention has been described using specific terms, such description is for illustrative purposes only, and it is to be understood that changes and variations may be made without departing from the spirit or scope of the following claims.

What is claimed is:

1. A method for analyzing the broadcast coverage of an antenna's transmission energy comprising the steps of:
   receiving antenna information having beam tilt information representing broadcast characteristics for a given geography for said antenna;
   determining a first intercept point for a predetermined decrease in field strength of said transmission energy according to said antenna information;
   determining a second intercept point for said predetermined decrease in field strength according to said antenna information;
   determining a broadcast area defined by said first intercept point and said second intercept point; and,
   outputting said broadcast area so that said broadcast area can be provided representing the broadcast coverage of the antenna for said predetermined decrease in field strength.

2. The method of claim 1 including the step of outputting said broadcast area graphically.

3. The method of claim 2 including the step of:
   providing a geographic representation of the geography associated with said antenna;
   overlaying said graphical output of said broadcast area with said geographic representation so that said broadcast area can be displayed in relation to said geography associated with said antenna.

4. The method of claim 1 wherein said step of determining a first intercept point includes performing a Longley-Rice calculation according to said antenna information.

5. The method of claim 1 including the step of:
   providing comparison beam tilt information representing a second beam tilt for said antenna;
   determining a comparison first intercept point for said predetermined decrease in field strength according to said antenna information and said comparison beam tilt information;
   determining a comparison second intercept point for said predetermined decrease in field strength according to said antenna information and said comparison beam tilt information;
   determining a comparison broadcast area defined by said comparison first and said second intercept points; and,
   outputting said broadcast area in relation to said comparison broadcast area so that the broadcast coverage of said beam tilt and said comparison beam tilt can be know.

6. The method of claim 1 including the step of:
   determining a third intercept point for a second predetermined decrease in field strength according to said antenna information;
   determining a second broadcast area defined by said third intercept point and said first intercept point; and,
   outputting said second broadcast area representing the coverage of the antennae for said second predetermined decrease in field strength.

7. The method of claim 6 including the step of:
   determining a fourth intercept point for a second predetermined decrease in field strength according to said antenna information;
   determining a third broadcast area defined by said fourth intercept point and said second intercept point; and
   outputting said third broadcast area representing the coverage of the antennae for said second predetermined decrease in field strength.

8. A method for analyzing the broadcast coverage of a plurality of antennae comprising the steps of:
   receiving antenna information having beam tilt information for each one of said plurality of antennae representing the broadcast characteristics for a given geography for each one of said plurality of antennae;
   determining a first intercept point of a predetermined decrease in field strength for each one of said antennae according to said plurality of antenna information;
   determining a second intercept point of said predetermined decrease in field strength for each one of said antennae according to said plurality of antenna information;
   determining a broadcast area defined by said first intercept point and said second intercept point for each one of said plurality of antennae; and,
   outputting said broadcast areas for each one of said plurality of antennae so that the collective broadcast coverage, including broadcast overlaps, is provided.

9. The method of claim 8 including the steps of:
   outputting said broadcast areas graphically;
   providing a geographic representation of the geography associated with each of said plurality of antennae; and,
   overlaying said graphical broadcast areas with said geographic representations so that said broadcast areas can be displayed in relation to said geography associated with each of said antennae.

10. A system for analyzing broadcast coverage of at least one antenna comprising a computer readable medium;
    a set of computer readable instructions contained within said computer readable medium for receiving antenna information representing the broadcast characteristics of at least one antenna for a given geography, determining a first intercept point of said predetermined decrease in field strength according to said antenna information, determining a second intercept point of a predetermined decrease in field strength according to said antenna information, determining a broadcast area defined by said first intercept point and said second intercept point so that said broadcast area can be provided representing said broadcast coverage of said antennae for said predetermined decrease in field strength.

11. The system of claim 10 wherein said computer readable instructions include instructions for displaying said broadcast area graphically.

12. The system of claim 11 wherein said computer readable instructions include instructions for displaying said graphical broadcast area overlaying a geographical representation of the geography associated with said antenna so that said broadcast area is provided in relation to said geography associated with said antenna.

13. The system of claim 10 wherein said computer readable instructions include instructions for determining a first intercept point according to a Longley-Rice calculation and to said antenna information.

14. The system of claim 10 wherein said computer readable instructions include instructions for determining a third intercept point for a second predetermined decrease in field strength according to said antenna information, determining a second broadcast area defined by said third intercept point and said first intercept point, and outputting said second broadcast area representing the coverage of said antennae for said second predetermined decrease in field strength.

15. The system of claim 14 wherein said computer readable instructions include instructions for determining a fourth intercept point for a second predetermined decrease in field strength according to said antenna information, determining a third broadcast area defined by said fourth intercept point and said second intercept point, and outputting said third broadcast area representing coverage of said antennae for said second predetermined decrease in field strength.

16. The system of claim 10 wherein:

said antennae includes beam tilt information; and, said set of computer readable instructions includes instructions for receiving comparison beam tilt information representing a second beam tilt for said antenna, determining a comparison first intercept point for said predetermined decrease in field strength according to said antenna information and said comparison beam tilt information, determining a comparison second intercept point for said predetermined decrease in field strength according to said antenna information and said comparison beam tilt information, determining a comparison broadcast area defined by said comparison first and second intercept points, and outputting said broadcast area in relation to said comparison broadcast area so that the broadcast coverage of said beam tilt and said comparison beam tilt can be known.

* * * * *